United States Patent [19]

Rawlings et al.

[11] Patent Number: 5,120,121
[45] Date of Patent: Jun. 9, 1992

[54] COLORED LENS

[75] Inventors: David L. Rawlings, Bayville, N.Y.; Qi-Bin Bao, Newark, Del.; Patrick Chen, Edison, N.J.; Alix A. Moore, Santa Ana, Calif.

[73] Assignee: Allergan, Inc., Irvine, Calif.

[21] Appl. No.: 329,431

[22] Filed: Mar. 28, 1989

Related U.S. Application Data

[63] Continuation-in-part of Ser. No. 222,709, Jul. 21, 1988, Pat. No. 5,034,166.

[51] Int. Cl.$^5$ .................................................. G02C 7/04
[52] U.S. Cl. ................................. 351/162; 351/160 H
[58] Field of Search .............. 351/160 R, 160 H, 161, 351/162

[56] References Cited

U.S. PATENT DOCUMENTS

| D. 211,757 | 7/1968 | Urbach | D57/1 |
|---|---|---|---|
| 3,286,394 | 11/1966 | Brudney | 351/162 X |
| 3,476,499 | 11/1969 | Wichterle | 8/4 |
| 3,536,386 | 10/1970 | Spivack | 351/160 R |
| 3,679,504 | 7/1972 | Wichterle | 156/62 |
| 3,712,718 | 1/1973 | LeGrand | 35/160 R |
| 3,846,199 | 11/1974 | Capelli | 351/162 X |
| 4,210,391 | 7/1980 | Cohen | 351/161 |
| 4,252,421 | 2/1981 | Foley, Jr. | 351/162 |
| 4,447,474 | 5/1984 | Neefe | 427/164 |
| 4,468,229 | 8/1984 | Su | 8/507 |
| 4,472,327 | 9/1984 | Neefe | 264/1.9 |
| 4,582,402 | 4/1986 | Knapp | 351/162 |
| 4,702,574 | 10/1987 | Bawa | 351/162 |
| 4,704,017 | 11/1987 | Knapp | 361/177 |
| 4,710,327 | 12/1987 | Neefe | 264/1.7 |
| 4,889,421 | 12/1989 | Cohen | 351/162 |
| 4,923,480 | 5/1990 | Monestere | 351/162 X |

FOREIGN PATENT DOCUMENTS

| 815956 | 6/1969 | Canada | 18/12 |
|---|---|---|---|
| WO85/04679 | 10/1985 | European Pat. Off. . | |
| 0127450 | 5/1986 | European Pat. Off. . | |
| 0158999 | 4/1987 | European Pat. Off. . | |
| 0262832 | 4/1988 | European Pat. Off. . | |

Primary Examiner—Scott J. Sugarman
Attorney, Agent, or Firm—George A. Skoler

[57] ABSTRACT

A molded plastic cosmetic contact lens made in a repetitive manner comprising a cosmetic pattern of clustered networks of interconnected thin colored lines radiating from and about the periphery of the pupil portion in a direction inclined towards and in contact with the periphery of the iris portion and residing within the iris portion. The lens can be made by molding in a manner that the cosmetic pattern becomes part of the body of the lens.

21 Claims, 5 Drawing Sheets

FIG. 5
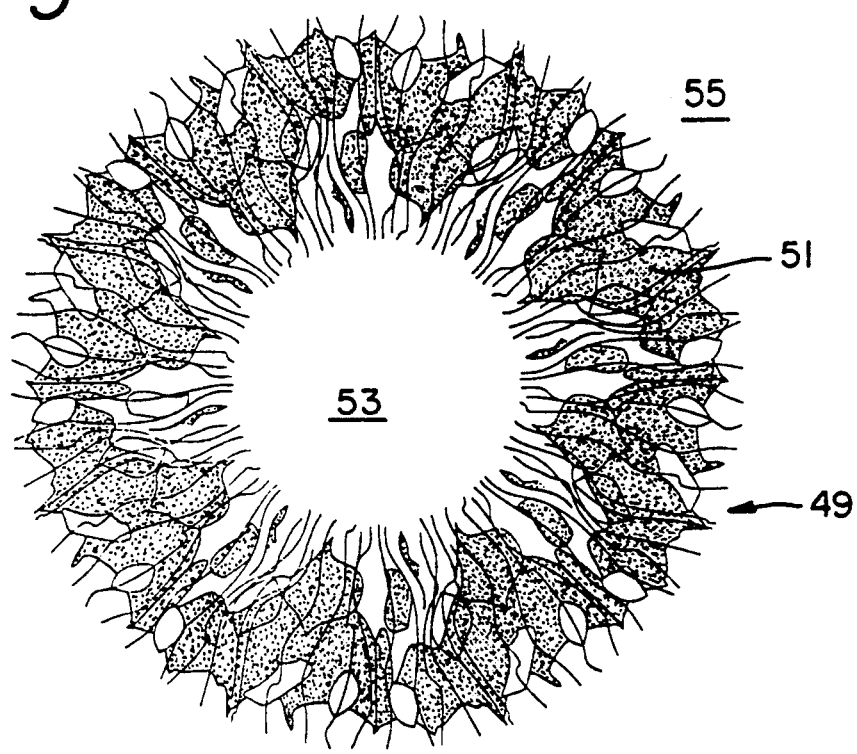
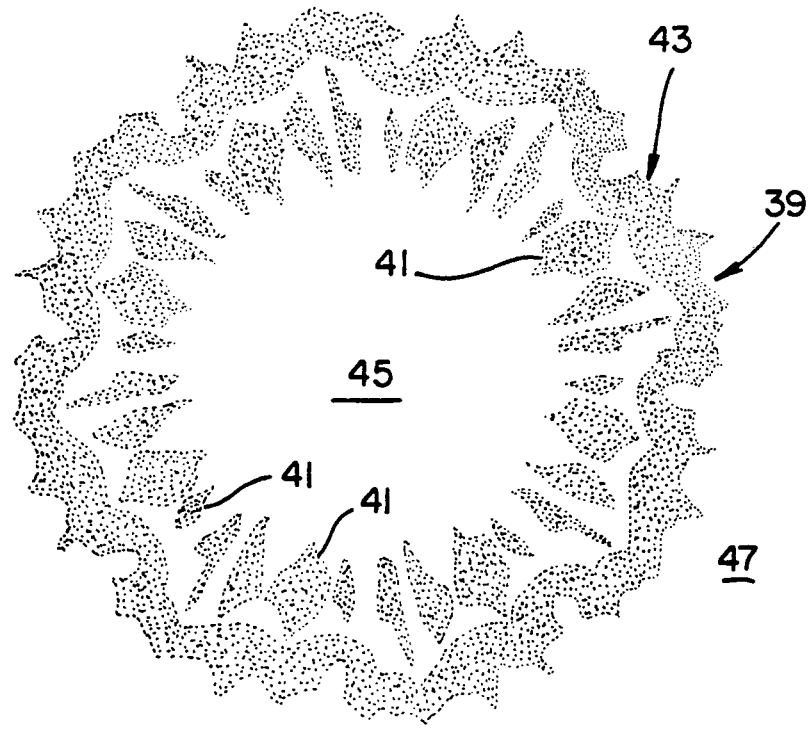
FIG. 4

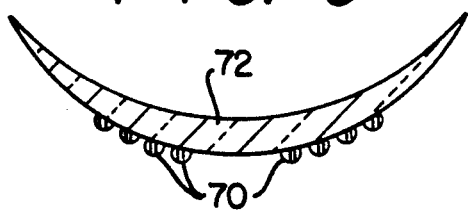
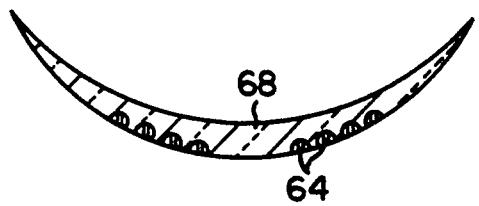
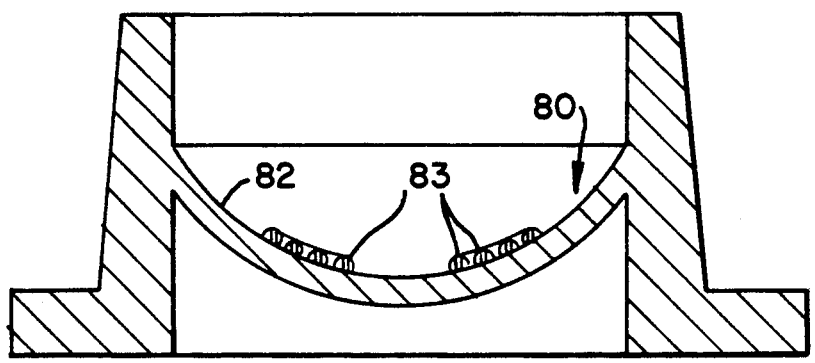
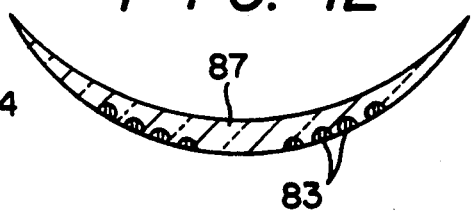
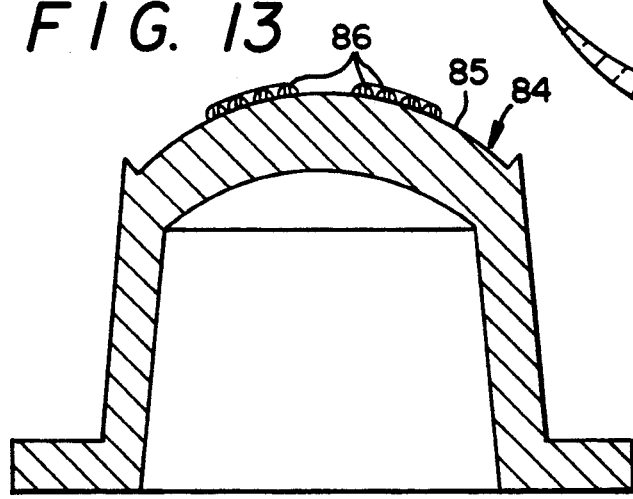
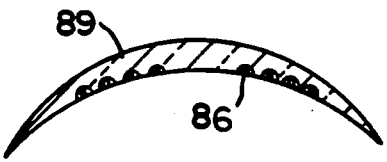

COLORED LENS

Related Application

This application is a continuation-in-part of commonly assigned, copending U.S. application Ser. No. 222,709, filed Jul. 21, 1988 now U.S. Pat. No. 5,034,166.

BRIEF DESCRIPTION OF THE INVENTION

A cosmetic contact lens made in a repetitive manner comprising an open sclera portion, a decorative iris portion and an open pupil portion, in which the iris portion circumscribes the pupil portion and, in turn, is circumscribed by the sclera portion, wherein the iris portion comprises a pattern of repeating clusters of a substantially interconnecting networks of colored lines with lines in the networks varying in thickness throughout the pattern, which clusters radiate from and about the periphery of the pupil portion in a direction inclined towards and in contact with the periphery of the iris portion, and the pupil portion is transparent and free of such pattern.

BACKGROUND OF THE INVENTION

There is a social image in many cultures that certain eye colors, especially blue and green, are the most attractive. As with hair color, there is a segment of the population that seeks to alter their genetic inheritance by artificial contrivances such as through the use of hair coloring and tinted contact lenses. There has been a recognition for many years that tinted contact lenses are a growth opportunity for the contact lens industry. As contact lenses have gained greater popularity because of a general acceptance of their value, greater public sensitivity to personal appearance, improved contact lens technology (hard lenses vs. soft lenses vs. oxygen permeable lenses, etc.), and a general improvement in personal wealth, there has been an upsurge in demand for tinted contact lenses. Over the years, a variety of manufacturing techniques have been developed for making tinted contact lenses. Tinted ("colored") contact lenses come in two types. The first are contact lenses which use essentially transparent enhancement colors that allow the color of the natural iris to show through the lens and combine with the natural color to produce a new appearance. Such tinted lenses is typically be used to turn a hazel eye to an aqua colored eye. This class of colored lenses may not be able to change an underlying dark colored, brown iris to blue. The second category is the opaque class of tinted lenses in which the color masks the natural iris color and presents a new color on the outside of the eye. This class of lenses is able to render a brown eye blue.

Various methods have been employed to produce these two categories of lenses. They differ in a number of ways, but primarily so in the selection of opacifying or non-opacifying media as part of the coloration of the lens. The use of an opacifying media blocks the appearance of the iris from showing through the lens unless the coverage of the media over the iris portion of the lens is less than complete. The texture of the coverage of the opacifying media on or in the lens will be a significant factor in the cosmetic quality of the lens.

Wichterle, U.S. Pat. No. 3,476,499, patented Nov. 4, 1969, describes that—

"It has also been attempted selectively to color hydrogel contact lenses by surface printing. An imprint on the exposed outer surface of the lens is unacceptable for reasons of appearance and it is very difficult to produce an imprint on the inner or contact surface of the lens which does not unfavorably affect the smooth surface finish necessary for avoiding irritation of the cornea."

Consequently, the patentee employs rotational molding to cause a precipitated light absorbing material in the polymerizable mixture to be distributed to an annular zone about the vision region of the lens.

Spivack, U.S. Pat. No. 3,536,386, patented Oct. 27, 1970, describes a contact lens containing a "simulated iris." The patentee imprints the lens in the iris annulus with an opaque colorant. According to the patentee, "a picture taken of a desired iris is imprinted on each opaque imprint."

According to Foley, U.S. Pat. No. 4,252,421, patented Feb. 24, 1981: "One prior art method is to paint or print a colored central portion onto a soft contact lens using an implement such as a brush." Another technique involves "a chemical printing process for coloring soft contact lenses." Foley cites "several problems with the printing type of technique." They are: "the color is only printed on the lens after it has been manufactured and, therefore, is not uniformly dispersed through the lens material itself." "Water soluble dyes have also been used to provide the tinting." Foley employs a water soluble dye to tint that is polymer bound to the backbone of the polymerized co-monomer mixture used to make the lens. In this respect, reference is made to Su, U.S. Pat. No. 4,468,229, patented Aug. 28, 1984, for another disclosure on the use of polymer bound dyes. According to Su, col. 7, lines 34–37:

"Thus, it is possible without difficulty to prepare lenses with, e.g., colored central portions and clear edges, or with an annular colored portion corresponding to the iris."

Su further states, at col. 7, lines 50–58:

"When it is desired to apply the dye to one surface only, or to specific portion of the surface, the prepared lens may be placed on a fixture or in a mold, and the reactive dyestuff formulation applied only to a specific portion or portions of the lens surface."

Foley, at col. 10, lines 51–60, describes two molding methods for making a tinted lens, and at col. 11, lines 24–33, a third method, which are discussed as follows:

"By the first method, the tinted button is polymerized first, placed in a mold and a hydrogel co-monomer mixture is poured around the periphery of the tinted button and polymerized. The second method is to polymerize the clear button initially and form a centrally positioned aperture through this clear button. The co-monomer mixture including the dye is then poured within this aperture and polymerized."

"A third method for forming the clear and tinted button combination is to form either a tinted or clear button of the normal soft contact lens blank size, slice this button in half and polymerize a co-monomer mixture of the opposite type, i.e., tinted or clear, onto the originally formed button thereby forming a 'double layer' button with the lower portion of the button being tinted or clear and the upper portion being the opposite. In the cutting step the colored portion should be on the bottom so that the depth of cut used in forming the base curve will determine the diameter of the tinted area."

Wichterle, U.S. Pat. No. 3,679,504, patented Jul. 25, 1972, describes a number of techniques for making a colored molded contact lens. One technique, shown in French Patent No. 1,499,774, casts a polymer layer of the lens on a rotating mold, a very thin layer of opaque matter is deposited on the exposed polymer face (layer) and covered with a second layer of the monomer mixture, which is then polymerized under rotation to form the finished lens. The opaque material may simulate the iris, pupil, and/or the sclera of an eye. Another technique involves "forming first a thin covering layer of the hydrophylic polymer on a regular surface of a smooth pad, e.g. on a polished glass plate. Such plan-parallel very thin layer may be easily made by putting a drop of the initiated monomer mixture onto the pad and covering it with a smooth covering plate, e.g. a thin glass plate such as used for covering specimen for microscopical examination. Air bubbles are to be avoided. As soon as the access of the oxygen is excluded, the polymerization takes place rapidly. The covering plate is removed, if necessary after swelling the polymer in water or alcohol. The polymer layer dries rapidly when exposed to the atmosphere. Now, the colored pattern can be drawn in front view onto a planar surface so that the drawing and/or dyeing is very convenient and reliable. The pattern or a part of it may be also printed using a stamp or other printing die or stencil. Alternatively, a ready made pattern on a thin foil, e.g. a color film copy, may be laid onto the first polymer layer. Thereafter another drop of the initiated monomer mixture is put onto the pattern and covering layer, and a finished hydrogel contact lens or the front part of the artificial eye is pressed slightly thereon until the whole is firmly bound by the polymerized monomer mixture which has partly penetrated into the two hydrogel layers. The procedure is made easier if the hydrogel lens or the front part of the artificial eye is first polymerized under at least partial dehydration, the lens or similar being pressed onto a smooth glass or metal surface heated above about 100 degrees C. The dehydrated polymer becomes soft and plastic at about 120 degrees C., but any amount of water contained therein decreases the softening temperature. The lens and the pad are then cooled down under the softening temperature so that the lens, after having been removed from the pad, is now planarized. It can be easily bonded to the covering layer with the colored pattern by a single drop of initiated monomer mixture. Finally, the whole is swelled, advantageously in water or in a physiologic solution, whereby the lens or the front part of the artificial eye returns to its original shape. The change of curvature caused by the thin covering layer and pattern is in most cases negligible. If necessary, the original lens may be a little more curved so that the change shifts the curvature to the desired optimum.

Wichterle, Canadian Patent No. 815,956, issued Jun. 24, 1969, also describes techniques for making colored molded lens. At page 1, the patentee describes "Swollen contact lenses or eye protheses from such hydrogels can easily be coloured for instance with reactive dyes which become bonded the hydroxyl groups, or with other soluble or insoluble dyes, or possibly pigments, which can be mixed into a monomeric mixture before polymerization (Czechoslovak Patent No. 116,900). Soluble dyes easily pass into the eye so that it is as a rule more convenient to use insoluble dyes and especially covering pigments. However, pigments in a poorly viscous monomeric mixture before the beginning of polymerization easily sediment, especially in a rotating mould, and appear then on the outer surface of the lens. This is undesirable because every pigment would have to be subjected to may years testing for physiological harmlessness, and also for aesthetic reasons because a lens or prosthesis coloured on the surface with a covering dye or pigment lacks the natural lustre of the eye in which the coloured layer of the iris is located below the transparent cornea [sic]. In order to comply with hygienic and aesthetic requirements it is most suitable to have when the coloured layer located inside the lens in order that it may not come into contact with the living tissue and be covered with a transparent hydrogel layer."

Canadian Patent 815,956, thereafter describes a method for making a molded colored lens which appears to be the same represented for French Patent No. 1,499,774, supra.

LeGrand, et al., U.S. Pat. No. 3,712,718, patented Jan. 23, 1973, describes a procedure of making a colored lens by cutting into an already shaped lens and filling the cut with the coloring material. The pattern selected is variable but the pattern that appears to be most preferred is one that follows a cut groove that is random and follows an oscillating path about the iris portion of the lens. Needless to say, the dimensions of the groove is dependent upon the patentees capabilities of cutting the pattern into the lens.

Neefe, U.S. Pat. No. 4,472,327, patented Sep. 18, 1984, describes embedding light reflecting particles, such as mica or finely ground oyster shells, in the lens during molding.

Knapp, U.S. Pat. No. 4,582,402, patented Apr. 15, 1986, and U.S. Pat. No. 4,704,017, patented Nov. 3, 1987, describe the deposition of colored dots on the surface of a contact lens in the iris area. The patents use conventional printing with a soft pad which picks up the pattern from an etched plate and deposits the dot pattern onto the surface of the lens.

The lenses of these patents are apparently intended to be sold under the name DuraSoft3 Colors ® by the Wesley Jessen division of Schering Corp. It was noted upon inspection of a DuraSoft3 Colors ® lens that the most significant difference between the patents and the commercial lens is the apparently inadvertent[1] presence of small grid-like segments existing in a section of the iris portion of the commercial lens whereas the patents only describe the use of dots to effect the iris coloration. The intent from the use of colored dots in the iris portion of the contact lens is to effect the appearance of total coloration of the iris when the wearer of the cosmetic lens is viewed from a short distance away.

1. A recent New York Times article mentioning these lenses indicates that the cosmetic pattern is intended to be dots only.

The use of dots to effect coloration of the iris portion of a contact lens has been successful commercially. It is understood that prior attempts to make such cosmetic contact lenses depended on dyes for coloration or upon replication of the pattern of the natural iris. The former technique fails to provide enough opacity to make a brown eye have the appearance of a lighter color such as blue or green, whereas replication of the natural iris involves too much art work applied to the individual lens to be economically viable for large volume commercial exploitation.

As successful as the Wesley Jessen lenses have been, they are viewed to suffer from a number of deficiencies. First, they contain the ink pattern on the surface of the lens as a raised pattern, and this creates discomfiture to the wearer. Second, the dot pattern blends in without demarkation of the dots, so that to the viewer of the person wearing the lens, the eye appears bland in appearance. In essence, the dot pattern creates a non-textured coloration. The blandness of the lens can be somewhat alleviated by introducing some different colored dots into the dot pattern inked onto the outer surface of the lens. This introduces a two or more stepped printing sequence that can result in unwanted deregistration of the dot pattern which can cause a substantial number of lens rejections in a commercial operation. The care that would be required to properly register the different colored dots onto the lens would be expected to materially reduce the rate at which such multicolored lenses could be produced.

An alternative approach to reducing the blandness of the repetitive dot pattern would be to introduce more texture to the dots in the manner the artist effects in the painting style called pointillism. Texture is typically created by introducing depth to the pattern so that light plays off the sides of the individual dots to cause the viewer to see subtle multifaceted variations akin to that one sees in a woven fabric as compared to viewing a flat piece of colored plastic. To achieve this, it is necessary to have dots possessing depth and some irregularity along their sides. However, the process of the Knapp patents requires the dots to be printed onto the lens, and increasing the depth means increasing the height of the individual dots. This increases the discomfiture problem.

It would be desirable to have a cosmetic lens design that can be used to provide an opaque tint with texture and that lends itself to being mass produced at very low cost. Moreover, it would be desirable to be able to do this without using dots printed on the surface of a contact lens.

THE INVENTION

This invention encompasses a cosmetic lens design that can be used to provide an opaque tint with texture and that lends itself to being mass produced at very low cost. More particularly, the invention relates to a molded plastic cosmetic contact lens made in a repetitive manner comprising a cosmetic pattern of clustered networks of interconnected thin colored lines radiating from and about the periphery of the pupil portion in a direction inclined towards and in contact with the periphery of the iris portion and residing within the iris portion. The lens can be made by molding in a manner that the cosmetic pattern becomes part of the body of the lens.

The invention relates to a molded cosmetic contact lens made in a repetitive manner in which the contact lens comprises an open sclera portion, a decorative iris portion and an open pupil portion. The iris portion circumscribes the pupil portion and, in turn, is circumscribed by the sclera portion. The iris portion comprises a pattern of clusters of substantially interconnecting networks of colored lines with the lines in the networks varying in thickness throughout the pattern. The clusters radiate from and about the periphery of the pupil portion in a direction inclined towards and in contact with the periphery of the iris portion, and the pupil portion is transparent and free of such pattern.

A cluster of substantially interconnecting networks is defined as a component of the total design of the iris pattern. A cluster may comprise one network pattern that does or does not repeat itself within the total iris pattern. A group of clusters, whether each of them is the same or different network pattern, need not comprise the total iris pattern. For example, clusters of interconnected networks may be dispersed around the iris portion and separated from each other by stray lines that are not interconnected to any other line. It is preferred that most of the area of the iris portion comprise clusters. Preferably, at least 50% of the surface area of the iris portion is occupied by one or more clusters of interconnecting networks. It is more preferred to have at least about 75% of the surface area of the iris portion occupied by one or more clusters of interconnecting networks. In the most preferred embodiment of the invention, essentially all of the surface area of the iris portion is occupied by one or more clusters of interconnecting networks.

The aforesaid cosmetic contact lens of the invention creates a desirable level of texture by virtue of the variation in thickness and the length of the lines comprising the interconnected network. The term thickness as used herein encompasses the width and depth of the lines. The concentration of colored lines within the iris portion are sufficient to give the appearance, in the absence of optical magnification of the lens, of an essentially uniform color pattern across the whole of the iris portion, but the concentration of colored lines within the iris portion are insufficient to give the appearance of a textureless colored pattern. Such appearance is based upon a normal non-optically magnified viewing of the lens within about 5 feet of the lens.

In a preferred cosmetic contact lens of the invention, the iris portion comprises clusters of substantially interconnecting networks of irregular colored lines radiating in snaked and wavy patterns from and about the periphery of the pupil portion in a direction inclined towards and in contact with the periphery of the iris portion and residing within the iris portion. The thickness of the lines in the network vary in a predetermined manner throughout the network to create texture by virtue of the variation in width, depth and shape of the lines and in the length of the lines. The pupil portion is transparent and free of such network.

In a further embodiment of the preceding preferred cosmetic contact lens, the snaked patterns each stem and spread from a common trunk from and about the periphery of the pupil portion. The snaked patterns comprise a plurality of lines radiating in a direction inclined towards and in contact with the periphery of the iris portion and residing within the iris portion.

The cosmetic pattern provided in the iris portion of the lens utilizes spaces between the lines of the networks that are irregular in shape. These open spaces serve to accent the form of the lines thereby providing textural highlights to the pattern. In the desirable embodiment of the invention, the interconnecting networks comprise opaque matrices for the open spaces between the lines. The opaque solid network matrices comprise, in the typical case, from about 50 percent to about 95 percent of the area of the iris portion, preferably from about 60 percent to about 90 percent of the area of the iris portion, and in the most preferred case, about 65 percent to about 85 percent of the area of the iris portion.

In a very preferred embodiment of the invention, the lines of the network are embedded within the body of the lens at the anterior, posterior or both surfaces such that the surfaces have their regular shape. In the most preferred embodiment, texture is enhanced by providing an irregular or interrupted line pattern in the iris portion that extends into the depth of the contact lens body and utilizes the differences between the refractive index of the clear portion of the lens and the refractive index of the colored portion of the lens constituting the lines to contribute to the textured appearance of the lens.

The cosmetic contact lenses of the invention may be monofocal or bifocals. For example, if the contact lens is a bifocal lens of a Cohen lens design (see the U.S. patents to Allen L. Cohen, such as U.S. Pat. Nos. 4,210,391; 4,338,005; and 4,340,283), then one or both surfaces of the contact lens may possess an phase zone plate, and this would not be a departure from the invention. As a rule, the bifocal feature of the Cohen lens design resides exclusively in the pupil portion of the lens and most typically within the corneal bowl surface of the lens.

In one desired embodiment of the invention, the cosmetic contact lens is made of a thermoset (cured) resin and the cosmetic pattern on the iris portion of the lens is made from a thermoplastic polymer. In a modification of the invention, either the anterior or posterior surface of the cosmetic contact lens, in the iris portion of each surface, contains an opaque cosmetic pattern of the invention and the other surface of the lens contains a complimentary or coordinated opaque, translucent or transparent cosmetic pattern.

The invention also relates to a process for the reproducible manufacture of a molded contact lens containing a transparent central visual region circumscribed by a colored iris portion. The process comprises:

a. depositing a film of a colored liquid which comprises either a curable (thermosetting) or thermoplastic polymeric vehicle for the colorant therein in a mold for making a contact lens onto a surface thereof on which the iris portion of the lens is formed to produce a reproducible colored film thereon;

b. the film contains a surface exposed to the interior of the mold and a surface in contact with the mold;

c. the colored film comprises clusters of interconnected networks of colored lines radiating from and about the periphery of said pupil portion located on the mold surface in a direction inclined towards and in contact with the periphery of the iris portion on the mold surface and residing within said iris portion, with the thickness of the lines in the network varying in a predetermined pattern throughout the network; and d. charging the mold with a liquid lens-forming mixture used to form the body of the lens while maintaining the colored film in the iris portion; and e. configuring the lens forming mixture about the colored film whereby the surface of the film becomes integral with the body of the lens and the surface of the film becomes part of an outer surface of the lens when the molded lens is removed from the mold.

In a preferred embodiment of the process, the colored liquid comprises a thermoplastic polymeric containing vehicle for the colorant.

The process of the invention provides that the surface of the film and the lens is essentially smooth and continuous in the finished lens. In one embodiment, the colored liquid comprises a curable liquid which is essentially the same as that comprising the lens-forming liquid, and in another embodiment, the colored liquid comprises a thermoplastic polymeric coating composition, preferably an acrylic resin. The colored film may be opaque, translucent or transparent, and it preferably contains voids provided by the pattern deposited on the mold surface. The preferred lens of the invention contains at least one opaque colored film on at least one of the posterior and anterior surface of the lens. It is preferred that the colored film occupy at least about 50% to all of the area of the lens in the iris region thereof, and most desirably, the colored film occupies all of the area of the lens in the iris region (or that portion of the mold corresponding to the iris region of the lens). In the typical case, the colored film is provided on at least one of the anterior and posterior mold surfaces in carrying out the process. It is preferred that the colored film is provided on both the posterior surface and the anterior surface. There are special cosmetic effects achievable by providing the pattern on both the anterior and posterior surfaces.

In particular, the process of the invention relates to the manufacture of the colored lens by spin casting or cast molding the lens over a casting mold surface onto which was placed the colored film.

The terms color and colorant mean the full range of colors and color producing materials. To the extent that there may be confusion as to what constitutes a color, the definitions set forth in the *Webster's Third New International Dictionary*, unabridged, published by Merriam-Webster Inc., Springfield, MA 01102, for these terms are embraced by this invention. This means that black and white are regarded to be colors and colorants which are used to produce those colors are encompassed by this invention. The invention is particularly directed to the use of a multiplicity of colors such as one modifying or transparent or translucent color on one surface and an opacifying color on another surface. In some instances it is desirable to use more than one color in any pattern placed on or in surface of the lens. For example, superimposing a deregistered clustered colored line pattern over a predeposited different colored pattern provided in or on the lens is a method for providing contrasting or accentuating highlights in the lens. As pointed out above, this will add to the cost of producing the lens.

BRIEF DESCRIPTION OF THE DRAWINGS

FIG. 4 is plan view of tint mask which can be used as an underlay and/or overlay for the iris patterns of the invention, especially designed in this case to be used with the iris pattern of FIG. 3.

FIG. 5 is a plan view showing the combination of the iris pattern of FIG. 3 in combination with an underlay and/or overlay of a tint mask, such as shown in FIG. 4.

FIG. 9 is a cross-sectional view of a contact lens made according to the prior art.

FIG. 10 is a cross-sectional view of a contact lens made according to the invention.

FIG. 11 is a cross-sectional view of a casting mold containing the pattern on the anterior surface prior to addition of the resin.

FIG. 12 is a cross-sectional view of a contact lens of the invention made by the casting procedure.

FIG. 13 is a cross-sectional view of a casting mold in which the pattern is placed on the male surface to provide the pattern on the posterior side of the lens.

FIG. 14 is a cross-sectional view of a contact lens of the invention made by the casting procedure in which the pattern is on the posterior surface.

FIG. 15 is a cross-sectional view of a contact lens of the invention where the pattern is provided on both the posterior and anterior surfaces.

DETAILS OF THE INVENTION

Figure 1:
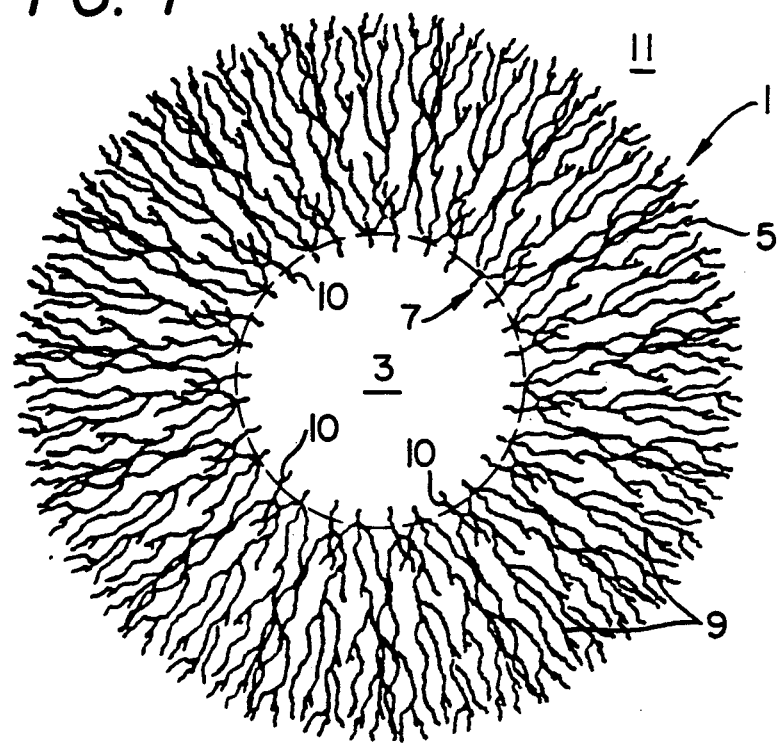
FIG. 1 is a plan view of the iris portion of a contact lens. The figure shows the donut shape of the iris portion within a contact lens. Not shown in the figure are an open sclera portion and a pupil portion of the contact lens in which the iris portion circumscribes the pupil portion and, in turn, is circumscribed by the sclera portion. In other words, the pupil portion is provided in the interior hole of the donut shape and the sclera portion surrounds the donut. The iris portion as shown contains clusters of interconnected networks of thin colored lines radiating from and about the periphery of the pupil portion in a direction inclined towards and in contact with the periphery of the iris portion and residing within the iris portion, with the thickness of the lines in the network varying in a predetermined pattern throughout the network, and the pupil portion is transparent and free of such network. In this illustration, the lines are wavy and serpentine in appearance, and emanate from common trunks like branches where the trunks are initiated from the interface of the periphery of the pupil portion and the iris portion.

The invention is directed to a colored plastic contact lens that is produced by molding in which color resides in the iris portion thereof in the form of clusters containing colored lines forming an interconnecting network. In particular, the invention relates to a smooth surfaced colored plastic lens in which the color is located within the iris region of the lens circumscribing the transparent vision or pupil region located in the central portion of the lens and is in the form of clustered networks of interconnecting opaque colored lines.

The invention contemplates a cosmetic contact lens that when worn provides aesthetic visual effects ranging from a natural to an unnatural appearing iris, which possesses a desirable textural effect—devoid of the blandness in visual appearance one typically associates with cosmetic contact lenses. In preferred embodiments of the invention, lines with wavy and meandering patterns are employed and their use lend a certain random appearance (herein termed "pseudo-random") to the overall cosmetic pattern when viewed up close. However, when the lens is worn, the wavy pattern is not noticeable to the normal observer of the lens wearer. However, the wavy and meandering patterns introduce texturizing effects that are noticeable to the normal viewer. The texturizing effects derive from the multifaceted angles generated by the wavy and meandering patterns of the lines. These angles cause a variety of subtle light reflectance patterns to emerge from the cosmetic lens.

The invention includes a contact lens in which a colored opaque pattern in the iris portion of the lens comprises networks of interconnecting opague lines and the space between the lines transmits light. The colored opague pattern stretches continuously across the iris region of the lens and extends into a portion of the lens' body. The colored opague pattern may exist at the anterior and/or the posterior surfaces of the lens. The colored opague pattern may be applied to the posterior and/or anterior surfaces of the lens during cast molding or spin cast molding of the lens by depositing the pattern on the male and/or female mold surfaces prior to the molding of the lens prior to supplying the lens forming material to the mold.

In a preferred embodiment of the invention, the pattern comprising the clusters containing the interconnected networks of thin colored lines, varies in concentration of the lines radiating from and about the periphery of the pupil portion in a direction inclined towards and in contact with the periphery of the iris portion and residing within the iris portion, with a lesser concentration of the lines in the region of the iris portion closest to the pupil portion and a greater concentration of the lines outside of said region. In any case, the thickness of the lines in the networks vary in a predetermined pattern throughout the networks, and the pupil portion is transparent and free of such networks. In other words, the iris portion of the lens of the invention comprises at least two annular regions, a first annular region circumscribing the pupil's periphery and possessing a depth that is spaced from the periphery of the pupil, and another region outside of the first annular region and possessing a depth that is spaced from the periphery of the first annular region. This embodiment provides for a less dense line pattern about the periphery of the pupil and serves to effect a more natural appearance for defining the transition between the pupil and the iris of the covered eye.

As pointed out above, the cluster patterns repeat in a predetermined manner. The purpose of this is avoid having a wearer with lenses that fail to match cosmetically. Each lens worn by an individual should look alike so that one lens does not look different from the other lens.

A significant feature of the invention, constituting a preferred embodiment, is the facile generation of a colored pattern in a plastic contact lens in which the pattern has depth, thereby providing visual texture, yet the surface of the lens is smooth. The lens of the invention does not have bumps on the surface (as would exist when the color is printed on the lens) that are irritating to the wearer. As a result, the lens of the invention is comfortably worn and provides a dynamic cosmetic effect because of the texturing. If the color is of an opacifying type, then the lens is of the opaque type.

These are important advantages over processes which involve printing directly to the lens surface such as applying dots to the surface of the lens which dots project outward from the surface. This type of printing directly to the lens increases the thickness of the lens thereby reducing oxygen transmissibility. This projection of the dots also causes lid sensation and some discomfort to sensitive contact lens wearers. It also provides opportunities for trapping debris on the surface of the lens as well as providing sites for buildup of protein deposition. The lens shown in FIG. 9 is a cross-sectional representation of this type of lens.

The preferred process of the invention involves a molded lens process in which the cosmetic pattern as described herein is first placed on a mold surface and sufficiently fixed to the mold surface so that the lens forming mixture which eventually will form the body of the lens can be placed on top of the pattern, and the combination can be molded together. The colored pattern can be placed on the mold by a variety of printing procedures. In fact, the pattern could be painted on the mold with a brush. Obviously, in the commercial manufacture of the lens, it is more desirable to print the pattern onto the mold surface using well known and understood automated techniques, such as by transfer printing from an etched plate ("cliché") of the pattern using a soft rubber pad. The pad may be made of a soft polydimethylsiloxane rubber, and equivalent type materials. The pattern may be created on the mold with an air brush, or by ink jetting, and the like methods of coating the colored pattern onto the mold. An interesting way of doing the coating is inject the liquid colored material from a die having a face that conforms to the shape of the mold's surface and possessing holes in the face configuring to the iris section on the mold's surface. The holes replicate the pattern to be coated on the mold. The die can be dropped to the surface of the mold like a date stamper, and the pressure on the die face can be used to force the colored material out of the die onto the mold.

The colored liquid used to form the colored pattern on the mold surface typically comprises a vehicle and a colorant. The vehicle involves a thermoplastic polymeric coating material or a curable (thermosetting) coating material provided in liquid form. The coating materials are per se liquid or rendered liquid by the use of a solvent or diluent. The vehicle may comprise a multiphase composition such as a dispersion of the coating material in a diluent such as water. A latex or emulsion is an illustration of this. The colorant may be any of the conventional reactive and non-reactive dyes in the art or taught by the art for use in tinting contact lens and the various pigmentary materials used by the art and coating industry. It is desirable that the coating material have the capacity of taking autoclaving conditions employed by the art for the sterilization of the lens. For example, it would be desirable that the coating material, when part of the final contact lens be able to effectively pass 150° C. autoclaving for about 5 to about 30 minutes. The colorant blended with the resin and in the final contact lens is desirably resistant to removal by lachrymal liquids or cleansing and bactericidal agents used to treat the lens in typical usage.

As noted above, the vehicle of the colored liquid can be a thermoplastic or curable. It is desirable to make the liquid by blending a colorant of choice into a plastic or resin while provided in liquid form in the usual fashions known to the art. The plastic may be the usual thermoplastic polymeric materials that are used in coatings, such water borne latex coating systems based upon acrylic resins, vinyl acetate resins, copolymeric resins containing acrylics or vinyl acetate. The acrylic resins are based upon homopolymers and copolymers of acrylates and methacrylates such as methyl acrylate, ethyl acrylate, 2-ethylhexyl acrylate, and the like, methyl methacrylate, n-propyl methacrylate. The vinyl acetate resins are homopolymers and copolymers derived from vinyl acetate. Of course, the plastic may be in a wholly organic solvent borne system rather than in a water borne latex (it is recognized that the typical latex possesses the plastic or resin dissolved in an organic solvent, the resultant solution is dispersed in water and the dispersion is maintained by the use of surface active agents).

Another resin that one may employ is of the curable type. Those resins may be classed as thermosetting insofar as they are not capable of being rendered thermoplastic. Of the resins of this type, and there are many that one could use in the practice of the invention, the most desirable are those that are either compatible with the liquid lens-forming mixture or are the same as the liquid lens-forming mixture. In this case, the colored pattern is deposited onto the mold surface as a liquid and may be subjected to a partial or total cure. The resin when coated as a liquid to the surface may be in the A or B-stage, that is, without any level of cure (A-stage) or partially cured but still liquid (B-stage). When the coating on the mold is in the A-stage, it is desirable to subject it to some curing to convert it to the B-stage. Prior to the addition of the liquid lens-forming mixture to the mold, the coating can be subjected to a full cure (C-stage) or the final cure can be withheld until the liquid lens-forming mixture had been added, the lens shape has been attained and the mixture has been subjected to the full cure to the C-stage.

In the preferred practice of the invention, the vehicle is thermoplastic. It has been found that thermoplastic vehicles for the colored pattern do not introduce unwanted shrinkage to the lens that causes minute crazing and/or indentation in the lens' surface. From the standpoint of enviromental considerations, it is desirable to use water based latexes or emulsions of the thermoplastic vehicles containing the colorant. Surprisingly, such a coating system works exceptionally well in making lenses that involve crosslinking of the lens forming material in the molding operation.

The liquid lens-forming mixture can comprise monomer, prepolymer or vulcanizable components. Particular suitable components are hydrophilic monomers preferably including those which form slightly or moderately crosslinked, three dimensional networks such as those disclosed in U.S. Pat. No. 3,822,089. Illustrative hydrophilic monomers include water soluble monoesters or an acrylic acid or methacrylic acid with an alcohol having an esterifiable hydroxyl group and at least one additional hydroxyl group such as the mono- and polyalkylene glycol monoesters or methacrylic acid and acrylic acid, e.g., ethylene glycol monomethacrylate, ethylene glycol monoacrylate, diethylene glycol monomethacrylate, diethylene glycol monoacrylate, propylene glycol monomethacrylate, dipropylene glycol monoacrylate, and the like; the N-alkyl and N,N-dialkyl substituted acrylamides and methacrylamides such as N-methylacrylamide, N,N-dimethylacrylamide, N-methylmethacrylamide, N,N-dimethylmethacrylamide, and the like; N-vinylpyrrolidone; and the alkyl substituted N-vinyl pyrrolidones, e.g., methyl substituted N-vinylpyrrolidone; glycidyl methacrylate; glycidyl acrylate; the unsaturated amines; the alkyl ethyl acrylates; solubilized collagen; mixtures thereof; and others known to the art.

hydrophilic monomers particularly useful in the practice of the invention to manufacture contact lenses include hydrophobic acrylic esters, suitably lower alkyl acrylic esters, preferably wherein the alkyl moiety contains 1-5 carbon atoms, such as methyl acrylate or methacrylate, ethyl acrylate or methacrylate, n-propyl acrylate or methacrylate, isopropyl acrylate or methacrylate, isobutyl acrylate or methacrylate, n-butyl acrylate or methacrylate, or mixtures thereof.

Other suitable monomers include the ethylenically unsaturated monocarboxylic acid esters, in particular, the methacrylic and acrylic acid esters of siloxane monomers and polymers with/without a pendant hydroxyl group. These monomers are well documented in the contact lens art; see, for example, U.S. Pat. Nos. 4,139,548; 4,235,985; 4,152,508; 3,808,178; 4,139,692; 4,248,989; and 4,139,513. The disclosure of the foregoing illustrative patents, to the extent intended herein, are incorporated by reference as if set out in text.

Among the preferred monomeric mixtures are those which contain at least one alkylene glycol monoester of methacrylic acid, especially ethylene glycol monomethacrylate, and at least one crosslinking monomer such as the alkylene glycol diester of methacrylic acid, especially ethylene glycol dimethacrylate. Such mixtures may contain other polymerizable monomers, desirably in minor amounts such as N-vinylpyrrolidone, methyl methacrylate, acrylamide, glycidyl methacrylate, N-methylacrylamide, diethylene glycol monomethacrylate, and others illustrated.

The above illustrated monomers, monomeric mixtures including mixtures of hydrophobic and hydrophilic reactants, may be further admixed with a minor proportion or di- or polyfunctional species include: divinylbenzene, ethylene glycol diacrylate or dimethacrylate, propylene glycol diacrylate or dimethacrylate, and the acrylate or methacrylate esters of the following polyols: diethanolamine, triethanolamine, glycerol, pentaerythritol, butylene glycol, diethylene glycol, triethylene glycol, tetraethylene glycol, mannitol, sorbitol, and the like. Other crosslinking monomers can be illustrated by N,N-methylene-bis-acrylamide or methacrylamide, sulfonated divinylbenzene, and divinylsulfone.

Additional lens-forming materials which are suitable in the fabrication of contact lenses are illustrated by one or more of the following U.S. Pat. Nos. 2,976,576; 3,220,960; 3,937,680; 3,948,871; 3,949,021; 3,983,083; 3,988,274; 4,018,853; 3,875,211; 3,503,942; 3,532,679; 3,621,079; 3,639,524; 3,700,761; 3,721,657; 3,758,448; 3,772,235; 3,786,034; 3,803,093; 3,816,571; 3,940,207; 3,431,046; 3,542,461; 4,055,378; 4,064,086; and 4,062,627.

The polymerization reaction can be carried out in bulk or with an inert solvent. Suitable solvents include water; organic solvents such as water-soluble lower aliphatic monohydric alcohols as well as polyhydric alcohols, e.g., glycol, glycerol, furfural, etc.; and mixtures thereof. Frequently, the solvent component utilizes, to control solution or dispersion viscosity, a minor amount of the reaction medium, i.e., less than about 50 weight percent. That portion of the solvent can be termed a reactive diluent.

Polymerization of the lens-forming mixture may be carried out with free radical catalysts and/or initiators or the type in common use in vinyl polymerization. Such catalyst species can include the organic peroxides, the alkyl percarbonates, hydrogen peroxides, and inorganic materials such as ammonium, sodium, or potassium persulfate. Polymerization temperatures can vary from about 20° C., and lower, about 100° C., and higher.

Polymerization of the monomer or prepolymer material can also be effected using, for example, radiation (U.V., X-ray, microwave, or other well-known forms of radiation) with/without the presence of well-known initiator(s) and/or catalyst(s).

When using radiation as the catalyst in the polymerization process, the polymerization column (tube), as typically used in spin casting, has to be fabricated from a material that will not impede the transmission of the radiation into the polymerization zone of the column. Glass, such as Pyrex, would be a suitable material for the polymerization column when using long wave U.V. radiation as the catalyst. When using other types of catalysts as recited above, the polymerization column could be fabricated from various types of metals, such as steel, nickel, bronze, various alloys, and the like.

In the fabrication of contact lenses by spin casting, the lens-forming material is placed in the mold cavity having an optical concave surface wetted by the material, and then intermittently and force fed, one at a time, into the inlet end of a rotating polymerization column which desirably comprises a "conditioning" zone near the inlet end and a polymerization reaction zone toward the outlet end. It is preferred that the molds be characterized by a pretreated optical surface to increase its hydrophilicity or wettability in a manner well-know in the art. The speed of rotation of the tube and the molds, when secured in interference fitting relationship, is adjusted to cause and/or maintain radially outward displacement of the lens-forming mixture to a predetermined lens configuration which when subjected to the polymerization conditions employed in the tube will form the desired shaped contact lens. Rotational speed of, for example, 300 r.p.m., and lower to 600 r.p.m., and higher, can be conveniently used. The precise rotational speed to employ in the operation is, of course, well within the skill of the artisan. Factors to be considered include the type and concentration of the components comprising the lens-forming material employed, the operative conditions of choice, the type and concentration of catalyst, initiator, and/or radiation energy source, and factors discussed previously and readily apparent to the artisan.

However, prior to the feeding of the lens-forming material to the mold, the molds are each treated to form the liquid colored pattern on the mold surface registered to cause coloration of the iris section of the lens while leaving the pupil or visual section of the lens transparent. Needless to say, the dimension of the visual section accommodates dilation of the eye. The pattern of the liquid colored pattern provided on the mold surface can be effected by the simple technique of making a metal plate comprising the pattern etched out by conventional techniques in the art. The etched pattern may be filled and leveled out with the colored liquid and a soft silicone rubber transfer stamp impressed upon the pattern to capture the pattern on the stamp's surface. The stamp is then brought to the mold, and depressed in the correct place to transfer the pattern to the mold thus creating the colored pattern. The colored pattern may then be subjected to partial polymerization or full cure, if the vehicle is not thermoplastic. Subsequently, the lens-forming material is fed to the mold.

FIG. 1 characterizes a preferred cosmetic pattern according to this invention. It shows a plan view of the iris portion 1 of a contact lens. The figure shows the donut shape of the iris portion 1 within a contact lens. Not shown in the figure are an open sclera portion and a pupil portion of the contact lens in which the iris portion circumscribes the pupil portion and, in turn, is circumscribed by the sclera portion. In other words, the pupil portion is provided in the interior hole 3 of the donut shape and the sclera portion comprises the surrounding area 11 about the donut. The iris portion 1 as shown contains a pattern comprised of clusters of interconnected networks of thin colored lines 9 radiating from and about the periphery of the pupil portion 1 in a direction inclined towards and in contact with the periphery of the iris portion and residing within the iris portion, with the thickness of the lines in the network varying in a predetermined pattern throughout the network, and the pupil portion is transparent and free of such network. In this illustration, the lines are wavy and meandering, and they emanate from common trunks 10 like branches 9 where the trunks are initiated from the interface 7 of the periphery of the pupil portion and the iris portion. Annular hatched lines 5 define an annular zone inside lines 5 and between interface 7 and lines 5 in in which the concentration of the lines in the network is less than is present in the pattern 1 outside of hatched lines 5, i.e., between annular hatched lines 5 and the periphery of portion 1. In addition, the spaces between lines 9 are elongated in shape and the aspect ratio of each space is greater than 1, preferably greater than 2, and most preferably greater than 3.

Figure 2:
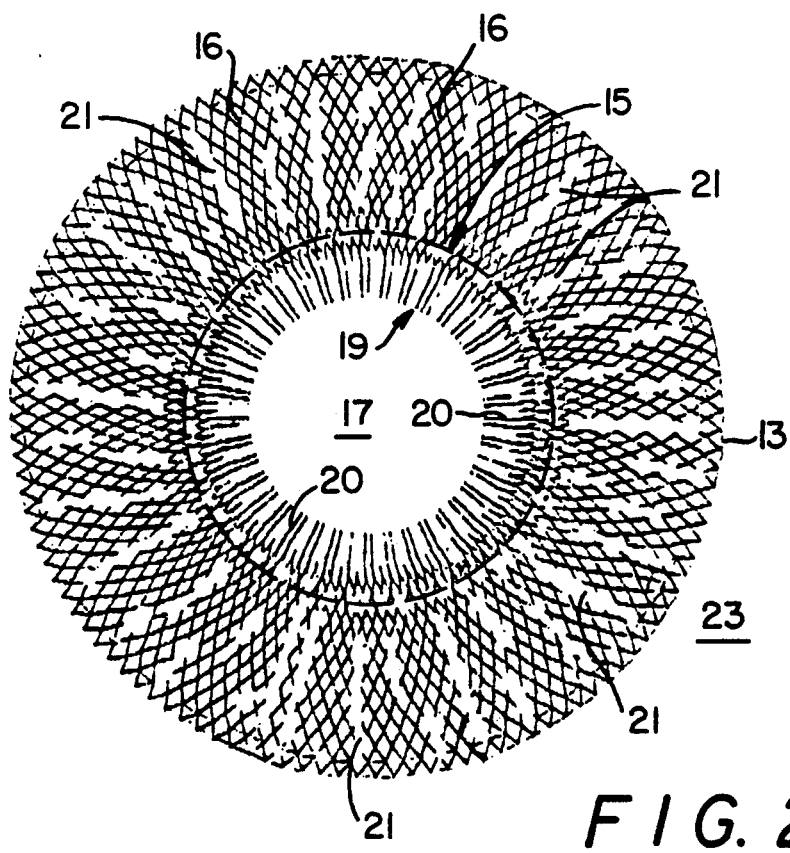
FIG. 2 is a plan view of another donut-shaped iris portion of a contact lens, similar to that of FIG. 1, in which the iris portion as shown contains clusters of pseudo-repeating patterns creating interconnected networks of thin colored lines radiating from and about the periphery of the pupil portion in a direction inclined towards and in contact with the periphery of the iris portion and residing within the iris portion, with the thickness of the lines in the network varying in a predetermined pattern throughout the network, and the pupil portion is transparent and free of such network. In this illustration, the lines are regular and curved and emanate from straight lines which initiate at the periphery of the pupil portion.

FIG. 2 depicts another cosmetic pattern encompassed by this invention. In FIG. 2, there is shown a plan view of another donut-shaped iris portion 13 of a contact lens, similar to that of FIG. 1, in which the iris portion 13, as shown, contains a pseudo-repeating pattern of clusters of interconnected networks of thin colored lines 16 radiating from and about the periphery of the pupil portion 17 in a direction inclined towards and in contact with the periphery of the iris portion 13 and residing within iris portion 13, with the thickness of the lines 16 in the network varying in a predetermined pattern throughout the network, and the pupil portion 17 is transparent and free of such network. In this illustration, the lines 16 are regular and curved and emanate from straight "trunk" lines 20 which initiate from the periphery and interface (with the iris section) 19 of the pupil portion. Annular hatched lines 15 define an annular zone inside lines 15 and between interface 19 and lines 5 in which the concentration of the lines in the network is less than is present in pattern 1 outside of hatched lines 15, i.e., between annular hatched lines 15 and the periphery of portion 13. In order to enhance the textural qualities of the pattern, there are introduced in portion 13 a series of separated space section 21 in portion 13 which are in addition to the regular spaces between lines 16. Spaces 21 are elongated in shape and the aspect ratio of each space is greater than 1, preferably greater than 2, and most preferably greater than 3. Sections 21 emphasize the cluster arrangement of the cosmetic pattern.

In FIGS. 1 and 2, the spaces between lines 9 and spaces 21 are distinctive in that the aspect ratio that is defined reflects that the height of the space is oriented in a direction skewed toward the radiated pattern of the opaque lines.

Figure 3:
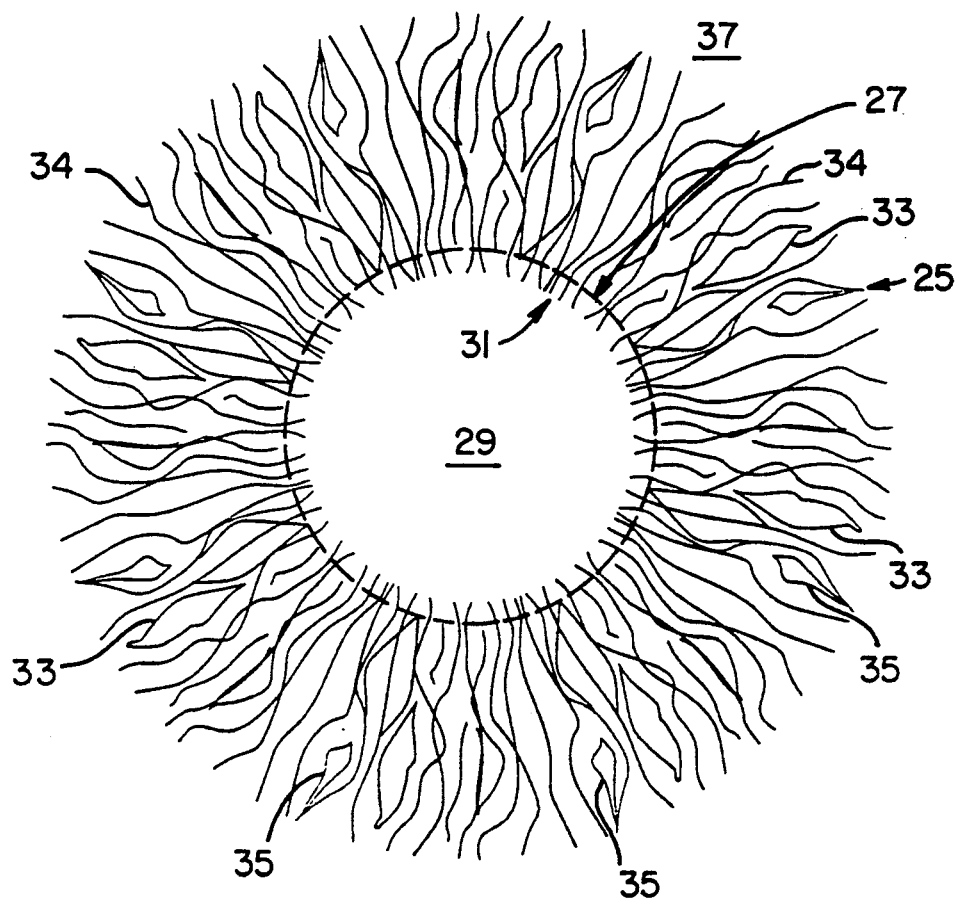
FIG. 3 is a plan view of another donut-shaped iris portion of a contact lens, similar to that of FIG. 1, in which the iris portion as shown contains clusters of less dense patterns of interconnected networks of thin colored lines radiating from and about the periphery of the pupil portion in a direction inclined towards and in contact with the periphery of the iris portion and residing within the iris portion, with the thickness of the lines in the network varying in a predetermined pattern throughout the network, and the pupil portion is transparent and free of such network. In this illustration, the lines are wavy, but less so than in the FIG. 1 pattern. This cosmetic pattern utilizes less interconnections between lines and a number of lines in the cosmetic pattern are independent of the cluster and not interconnected. In this design, more lines do not extend continuously from the pupil's periphery to the periphery of the iris portion. This design is most effectively utilized with tint masks which underlay and/or overlay it.

FIG. 3 shows another iris design within the contemplation of the invention. FIG. 3 is a plan view of another donut-shaped iris portion of a contact lens, similar to that of FIG. 1, in which, however, the iris portion 25 contains clusters of less dense patterns of interconnected networks of thin colored lines 34 radiating from and about the periphery 31 of the pupil portion 24 in a direction inclined towards and in contact with the periphery of iris portion 25 and residing within iris portion 25, with the thickness of the lines in the network varying in a predetermined pattern throughout the network, and pupil portion 24 is transparent and free of such network. In this illustration, lines 34 are wavy, but less so than in the FIG. 1 pattern. This pattern utilizes less interconnections between the lines, a number of lines, specifically lines 33 and 35, are independent and not interconnected. In this embodiment, lines 33 and lines 35 form closed looped patterns which are coordinated with a masking pattern illustrated in FIGS. 4 and 5. In addition, a number of lines 34 do not extend continuously from the pupil's periphery to the periphery of the iris portion. This design is preferably utilized with tint masks which underlay and/or overlay it.

FIG. 4 is plan view of tint mask which can be used as an underlay and/or overlay for the iris patterns of the invention, especially designed in this case to be used with the iris pattern of FIG. 3. Tint mask 39 comprises a free form periphery mask 43 comprising a transparent tint or a translucent mask upon which the iris pattern can be used to effect a pleasing contrasting pattern and create a sense of depth. The peripheral mask 43 can be used as an accent for mask or tint segments 42 which may be of another color or the same color as mask 43.

The masks surround the pupil portion 45. Circumscribing mask 43 is sclera portion 47.

FIG. 5 is a plan view showing the combination 49 of the iris pattern of FIG. 3 in combination with an underlay and/or overlay of a tint mask 51, such as shown in FIG. 4. The combination circumscribes pupil portion 53 and in turn is circumscribed by sclera portion 55. Color variations between the mask portions and the iris pattern offers many attractive pattern combinations. The mask portions can be in a translucent white or other colors complementary to the color or colors of the iris portion.

Figure 6:
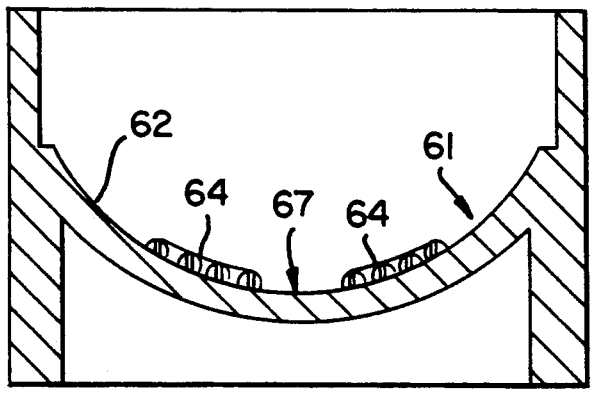
FIG. 6 is a cross-sectional view of a spincast mold showing the mold surface with the iris pattern of any of the previous figures projecting above the mold surface.

FIG. 6 is a cross-section view of spincast mold 61 showing the mold surface 62 with the colored iris pattern 64 representing in this illustration, the pattern of FIG. 1 above, projecting above this mold surface. Pattern 64 circumscribes section 67 of the mold surface. Section 67 corresponds with the visual region of the lens. Pattern 64 comprises liquid lens-forming monomer mixture which is doped with a monomer soluble ink or comprised of a water-based or borne pigmented acrylic paint such as used for artistic renderings.

The mold with the colored iris pattern pattern is then subjected to polymerization conditions if the vehicle of the colored iris pattern is curable and it aids in the formation of the lens to increase the pattern's viscosity prior to feeding the lens-forming monomer mixture to the mold. The polymerization conditions would be those that are appropriate for the particular initiator system used with the lens monomer (ultraviolet, heat, gamma radiation) in the colored iris pattern. The polymerization conditions can be selected such as to partially or fully polymerize the pattern on the mold surface. If the pattern is made of a thermoplastic material, the mold is heated to remove any solvent and/or water dilutants in the thermoplastic.

Figure 7:
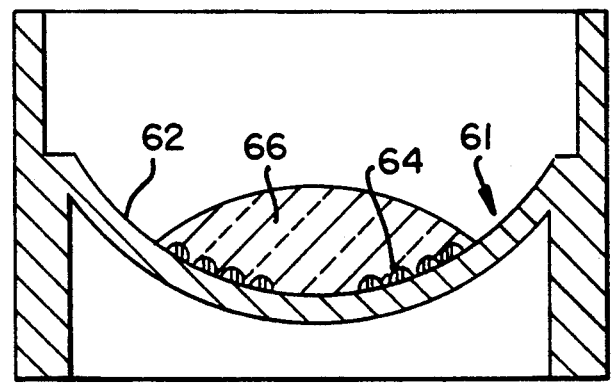
FIG. 7 is a cross-sectional view of the same spincast mold of FIG. 6 containing the resin solution for making the lens by casting.
Figure 8:
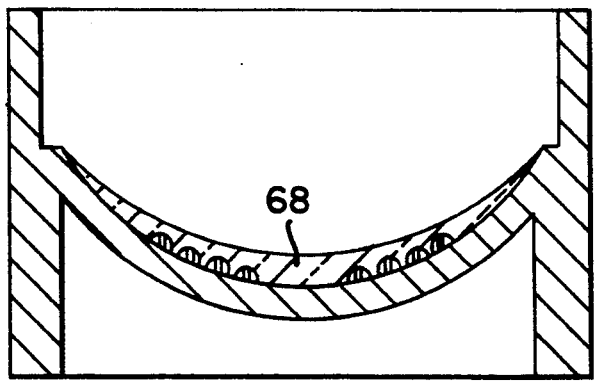
FIG. 8 is a cross-sectional view of the same spincast mold of FIG. 7 containing the resin solution spun into the shape of a contact lens.

The next step is shown in FIG. 7. Here conventional lens-forming monomer mixture 66 which does not contain any ink is dispensed into mold 61 onto mold surface 62 such that it submerges the previously polymerized or partially polymerized or thermoplastic colored iris pattern 64, as the case may be. FIG. 8 shows the lens monomer mixture in its spun geometry wherein it takes the shape 68 of a conventional spincast lens with the anterior surface being of a geometry determined by the mold surface and the posterior surface geometry being determined by the physics of spincasting. Again, polymerization conditions are applied to cause the conventional lens-forming monomer mixture to polymerize. In the case where it is chosen to only partially polymerize the colored iris pattern, the polymerization conditions are chosen such as to drive the lens monomer mixture and the colored iris pattern to full polymerization. It may be that partial polymerization of the colored iris pattern would be a preferable arrangement in order to promote a strong bond between the clear lens matrix and the colored iris pattern's surfaces. The lens is now treated as a conventional spincast lens wherein it is removed from its mold and processed using standard spincast lens processing techniques.

FIG. 10 illustrates the lens of the invention and shows that the cosmetic pattern is an integral component of the lens surface and demonstrates that the pattern is not projected above the lens surface. The pattern thus does not in any way affect the cross-sectional thickness of the lens. FIG. 9, on the other hand, demonstrates the prior art technique of printing a colored dot pattern onto the surface of the lens rather than to the mold surface. In this Figure, the pattern 70 lays as a bump or series of bumps on the surface of lens 72 creating the deficiencies enumerated above for such a structure.

The invention may be applied to the cast molding process. FIG. 11 shows an anterior mold 80 associated with the cast molding process with the colored iris pattern 83 of any of the various patterns herein characterized applied to its inside surface 82. FIG. 13 shows a posterior mold 84 used in the cast molding process with colored iris pattern 86 applied to its molding surface 85. FIG. 12 shows a cross sectional view of lens 87 formed as a result of applying pattern 83 to the anterior surface mold. This lens essentially has the same form as the spincast lens described previously. FIG. 14 shows a cross sectional view of lens 89 with pattern 85 which has been applied in posterior mold 84.

The methods described herein also provide for a combination arrangement wherein a colored iris pattern of one color can be applied to the posterior mold (for instance, white) and the same or different colored iris pattern can be applied to the anterior mold (for instance, dark blue). This then would result in a lens which could have either a multi-color textured appearance for extremely lifelike appearance or a brighter tint using a white background to reflect back out at the observer. Such a lens is shown in FIG. 15.

This latter technique can be effected by first fixing the pattern to both the posterior and the anterior molds as aforedescribed. Part of the lens-forming monomer mixture is supplied to each of the mold and each is partially polymerized thus fixing the patterns to the anterior and posterior surfaces of the lens. The two molds are combined, and the combination is interpolymerized by the addition of lens forming mixture to the mold and the mold surfaces are closed to the desired extent. Interpolymerization of the mold forming mixture completes the cure and the formation of the lens with the patterns on both surfaces.

We claim:

1. A molded plastic cosmetic contact lens made in a repetitive manner comprising an open sclera portion, a decorative iris portion and an open pupil portion, in which the iris portion circumscribes the pupil portion and, in turn, is circumscribed by the sclera portion, wherein the iris portion comprises a predetermined pattern of repeating clusters of substantially interconnecting networks of colored lines with the lines in the networks varying in thickness throughout the pattern, which clusters radiate from and about the periphery of the pupil portion in a direction inclined towards and in contact with the periphery of the iris portion, and the pupil portion is transparent and free of such pattern.

2. The molded plastic contact lens of claim 1 wherein the aforesaid cosmetic contact lens possesses a desirable level of texture by virtue of the variation in thickness and the length of the lines comprising the networks.

3. The molded plastic contact lens of claim 1 wherein the concentration of colored lines within the iris portion are sufficient to give the appearance, in the absence of optical magnification of the lens, of an essentially uniform color pattern across the whole of the iris portion, but the concentration of colored lines within the iris portion are insufficient to give the appearance of a textureless colored iris pattern.

4. The cosmetic contact lens of claim 1 wherein the lens is a monofocal lens.

5. The cosmetic contact lens of claim 1 wherein the lens is a bifocal lens.

6. The molded cosmetic contact lens of claim 1 wherein the lens body is made of a thermoset resin and the cosmetic pattern on the iris portion of the lens is made from a thermoplastic.

7. The molded cosmetic contact lens of claim 1 wherein the cosmetic pattern is opaque.

8. The molded cosmetic contact lens of claim 2 wherein the cosmetic pattern is opaque.

9. The molded cosmetic contact lens of claim 3 wherein the cosmetic pattern is opaque.

10. A cosmetic contact lens having an iris portion which comprises clusters of substantially interconnecting networks of irregular colored opaque lines radiating in a snaked pattern from and about the periphery of the pupil portion in a direction inclined towards and in contact with the periphery of the iris portion and residing within the iris portion, with the thickness of the lines in the networks varying in a predetermined manner throughout the network to create texture by virtue of the variation in thickness and shape of the lines and in the length of the lines, existing at either the anterior or posterior surface or both surfaces thereof, and the pupil portion is transparent and free of such network.

11. The cosmetic contact lens of claim 10 wherein the iris portion comprises clusters of substantially interconnecting networks of irregular colored lines radiating in a number of snaked patterns, wherein each pattern stems and spreads from a common trunk from and about the periphery of the pupil portion, in a direction inclined towards and in contact with the periphery of the iris portion and residing within the iris portion.

12. The cosmetic contact lens of claim 11 wherein there are spaces between the lines of the networks and the spaces are generally irregular in shape and spaces between the lines are not interconnected.

13. The cosmetic contact lens of claim 12 wherein open space between the lines serves to accent the form of the lines thereby providing textural highlights to the pattern.

14. The cosmetic contact lens of claim 13 wherein the networks comprise opaque matrices for the open spaces between the lines of the networks.

15. The cosmetic contact lens of claim 14 wherein the opaque solid network matrices comprise from about 50 percent to about 95 percent of the area of the iris portion.

16. The cosmetic contact lens of claim 15 wherein the opaque solid network matrices comprises from about 60 percent to about 90 percent of the area of the iris portion.

17. The cosmetic contact lens of claim 16 wherein the opaque solid network matrices comprises from about 65 percent to about 85 percent of the area of the iris portion.

18. The cosmetic contact lens of claim 10 wherein the lens is a molded contact lens and the lines of the clustered networks are embedded within the body of the lens at the anterior, posterior or both surfaces of the lens such that the surfaces have their regular shape.

19. The cosmetic contact lens of claim 18 wherein the texture is provided by irregular or interrupted line patterns in the iris portion that extends into the depth of the contact lens body and utilizes the differences between the refractive index of the clear portion of the lens and the refractive index of the colored portion of the lens constituting the lines to contribute to the textured appearance of the lens.

20. The cosmetic contact lens of claim 10 wherein the pattern comprises clusters of interconnected networks of thin colored lines which vary in the concentration of the lines radiating from and about the periphery of the pupil portion in a direction inclined towards and in contact with the periphery of the iris portion and residing within the iris portion, with a lesser concentration of the lines in the region of the iris portion closest to the pupil portion and a greater concentration of the lines outside of said region.

21. The cosmetic contact lens of claim 20 wherein there is a less dense line pattern about the periphery of the pupil which serves to effect a more natural appearance for defining the transition between the pupil and the iris portions.

* * * * *